June 3, 1924.

E. L. HAMILTON

CANDY DRAWING MACHINE

Filed July 7, 1922

INVENTOR.
ERNEST L. HAMILTON
BY HIS ATTORNEY

June 3, 1924.

E. L. HAMILTON

CANDY DRAWING MACHINE

Filed July 7, 1922

INVENTOR.
ERNEST L. HAMILTON
BY HIS ATTORNEY.
James F. Williamson

Patented June 3, 1924.

1,496,220

UNITED STATES PATENT OFFICE.

ERNEST L. HAMILTON, OF MINNEAPOLIS, MINNESOTA.

CANDY-DRAWING MACHINE.

Application filed July 7, 1922. Serial No. 573,402.

*To all whom it may concern:*

Be it known that I, ERNEST L. HAMILTON, a citizen of the United States, residing at Minneapolis, in the county of Hennepin and State of Minnesota, have invented certain new and useful Improvements in Candy-Drawing Machines; and I do hereby declare the following to be a full, clear, and exact description of the invention, such as will enable others skilled in the art to which it appertains to make and use the same.

This invention relates to a machine for operating on candy, and particularly to such a machine in which the candy is drawn. Certain kinds of candy are now made substantially in the form of taffy and after this taffy has been treated to a certain extent by pulling, and otherwise, the same is drawn out in the form of a ribbon and cut into various shapes.

It is an object of this invention to provide a machine for feeding and drawing longitudinally a batch or roll of such taffy or taffy-like candy.

It is a further object of the invention to provide such a machine comprising a series of rings having their openings forming a continuous channel through which the candy is progressed.

It is also an object of the invention to provide suitable means for delivering the candy to such channel and for forming the candy after the same has passed therethrough.

It is more specifically an object of the invention to provide a machine having a channel formed by the tapered openings of adjacent rings, said openings being oppositely threaded in adjacent rings and adjacent rings being rotated in opposite directions.

These and other objects and advantages of the invention will be more fully set forth in the following description made in connection with the accompanying drawings in which like reference characters refer to the same parts throughout the different views, and in which, Fig. 1 is a view in side elevation of the machine;

Figure 1:
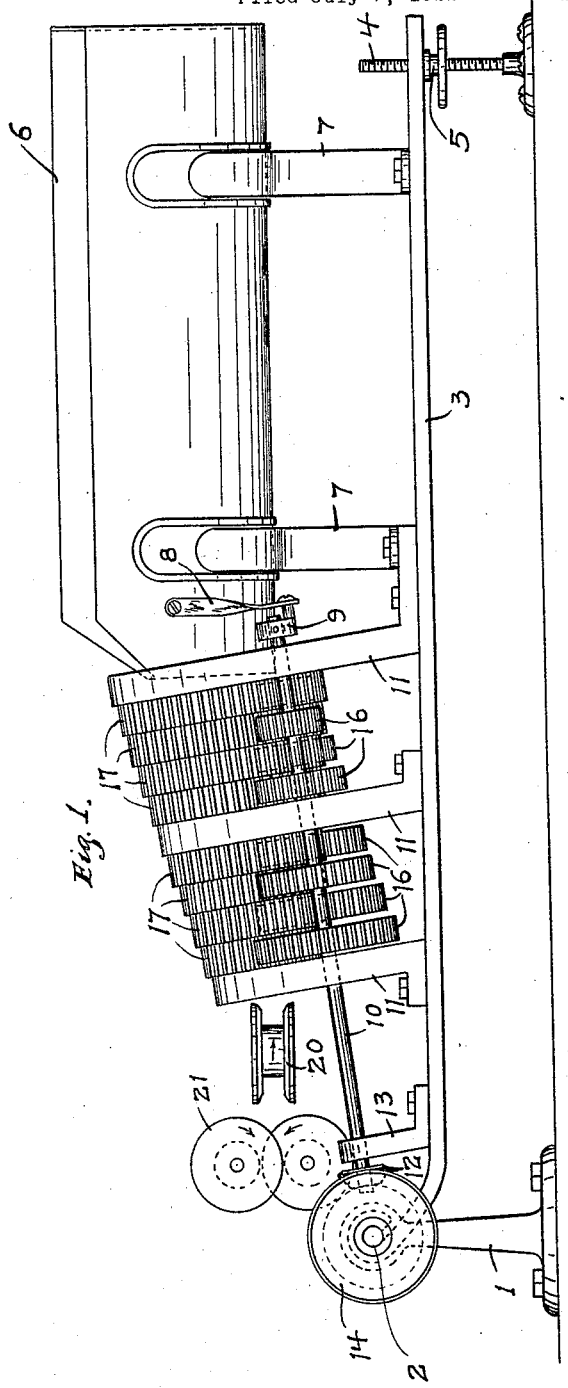
Figure 3:
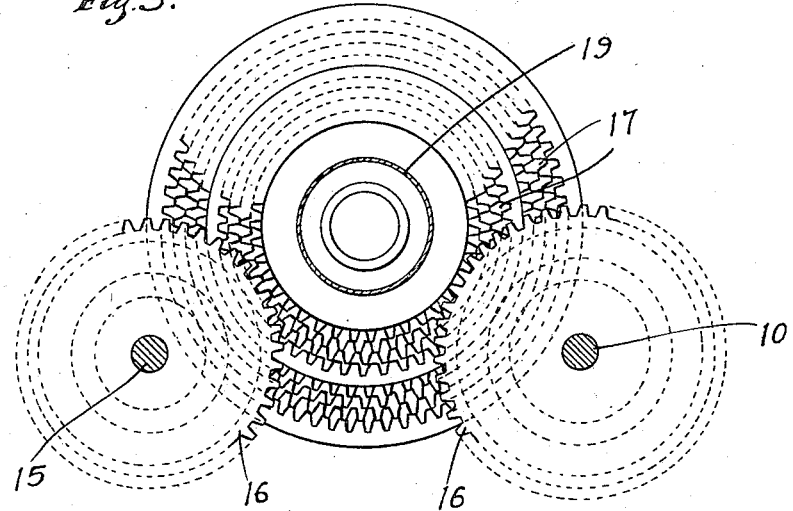
Fig. 3 is a vertical section taken on the line 3—3 of Fig. 2, as indicated by the arrows.
Figure 2:
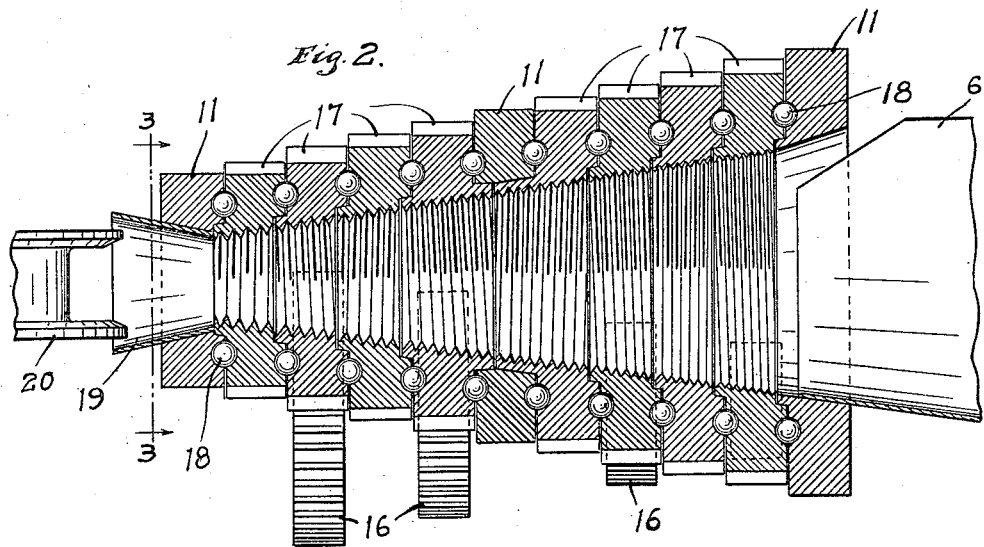
Fig. 2 is a central vertical section through one portion thereof.

Referring to the drawings, particularly to Fig. 1, the machine is shown as comprising one or more standards 1 forming the bearings for driving shaft 2 adapted to be driven by a suitable pulley or other gearing. A frame portion 3 has a bearing at one end swingingly mounted on the shaft 2 and this frame is supported at its other end on one or more screws 4, the same resting upon nut members 5 provided with suitable hand wheels for moving said nuts vertically on said screws. A trough member 6 having an open top and a bottom of semi-cylindrical shape is supported for oscillatory movement in standards 7 carried by a frame 3 and this trough 6 has a downwardly projecting arm 8 loosely engaged by a crank pin of small rotating crank 9 secured to one end of a driving shaft 10. The shaft 10 is supported in bearings formed on spaced frame members 11 bolted to the frame member 3 and carries at its other end a beveled pinion 12 adjacent an end supporting bracket 13 driven by a gear 14 secured to the shaft 2.

The bearing brackets 11 extend some distance across the frame 3 and are arranged to carry a second shaft 15 extending parallel to the shaft 10. The shaft 15 is adapted to be driven from the shaft 2 by a beveled gear and pinion not shown, substantially as is the shaft 10 and said shafts 10 and 15 carry a series of spur gears 16 of respectively different diameters, which gears are arranged to mesh with the teeth formed on the peripheries of a series of co-axial rings 17 supported on ball bearings 18 running in ball races formed in the frame members 11 and in the sides of said rings. It will be noted that the rings 17 are provided on one side with a recess adjacent the openings therein and on the other side with a projection, which recesses and projections are adapted to fit together so that the rings are supported and guided in alinement. The rings adjacent the central frame member 11 are of somewhat greater extent longitudinally than the other rings. In practice, however, the frame member 11 can be made quite small so that the rings adjacent thereto will have but slightly greater width than the main rings. It will be noted that the gears on shaft 10 engage alternate ones of the rings 17 while the other alternate rings are engaged by the gears on shaft 15, the shafts 10 and 15 being located on opposite sides of the axes of the rings 17 and rotating in opposite directions, it will be obvious that adjacent ones of the rings 17 are driven in opposite directions. It will be noted that the openings in the rings 17 are tapered and arranged to form a continuous conical passage of circular cross section. Said rings are interiorly threaded and the threads in adjacent rings are oppositely inclined, that is, that one ring is provided with a right hand thread while the adjacent ring is provided with a left hand thread. The said threads are also preferably of progressively steeper pitch from the ring having the larger opening to the ring having the smaller opening. It will be noted that the end of trough 6 extends into one of the frame members 11 adjacent the ring having the larger opening, and a flaring discharge tube 19 fits into the other end frame member 11 having its end adjacent the ring of smallest diameter.

The tube 19 is arranged adjacent and in alinement with the opening between a pair of flanged rolls 20 revolving on vertical axes and the opening between rolls 20 is in alinement with that between a pair of flanged rolls 21 adjacent thereto and revolving about horizontal axes. The rolls 20 and 21 revolve in the directions indicated by the arrows in Fig. 1 and said rolls will be driven by some suitable form of gearing and the rolls of said pairs will preferably be arranged to be adjustable toward and from each other.

As shown in Fig. 1, the lower surface of the channel formed by the rings 17 is arranged substantially horizontal or with a slight inclination downward. The trough 6 will also be adjusted by the nut 5 to be substantially horizontal or to have a slight downward inclination. The batch or roll of candy is placed in the trough 7 and by the oscillating movement of this trough and the semicylindrical shape of the bottom thereof, will be given more or less of a rounded shape on its lower side. The candy will be more or less drawn out into a roll and the end thereof will be sufficiently small to be inserted through the channel formed by rings 17 and engaged by the rolls 20. The machine now being driven, the candy is engaged by the threaded or ribbed interior surface of the ring 17 and owing to the inclination of these ribs is given a longitudinal movement or pull. If the rings 17 were all driven in the same direction the candy would have a tendency to roll up along the surface of the ring and for this reason the adjacent rings are driven in opposite directions, which tends to keep the candy centered in the bottom of the channel. As the candy progresses through the channel formed by said rings, it will be drawn out more and more, due to the increased pitch of the threads or ribs on the interior surface of the rings and owing to the increased speed of the interior surface of the rings. The candy will thus be drawn out into a thin portion as it passes through the ring 17 and will be delivered out through the tube 19. This thin roll of candy will then be engaged by the rolls 20 and formed into a more or less flattened shape and will then pass through the rolls 21. By the action of these two pairs of rolls a flat bar of candy of substantially uniform width and thickness will be formed which can then be cut up into the desired shapes. It will be obvious that the distance between the pairs of rolls 20 and 21 may be varied as desired and that the inclination of the frame 3 may be suitably varied to give the desired results.

From the above description it is seen that applicant has provided a simple and efficient candy feeding and drawing machine and one which will automatically and efficiently draw the candy into a bar of small cross section. The machine once started will need practically no attention and the candy will be progressed therethrough in a clean and sanitary condition.

It will, of course, be understood that various changes may be made in the form, details and arrangement of the parts without departing from the scope of applicant's invention, which, generally stated, consists in the matter shown and described and set forth in the appended claims.

What is claimed is:

1. A candy handling machine having in combination a series of rings arranged to form a continuous channel therethrough, and means for rotating adjacent ones of said rings in opposite directions, the axis of said rings being inclined to the vertical.

2. The structure set forth in claim 1, said rings having successively smaller tapered openings from one end of said series to the other arranged to form a continuous conical interior surface.

3. A candy handling machine having in combination, a transversely oscillating trough of semi-cylindrical cross section, a device comprising a channel formed by oppositely rotating adjacent rings to which said trough delivers, a pair of rolls to which said device delivers, and a pair of rolls having their axes at right angles to the axes of said first mentioned rolls to which said first mentioned rolls deliver.

4. The structure set forth in claim 3, and means for varying the longitudinal inclination of said trough.

5. The structure set forth in claim 3, the bottom of the channel formed by said ring being substantially alined with the bottom of said trough and being disposed substantially in a horizontal plane.

6. A candy handling machine having in combination, a series of rings arranged to form a continuous channel therethrough, said rings having ribs on their interior surfaces, said ribs on adjacent rings being inclined in opposite directions, and means for rotating adjacent rings in opposite directions the axis of said rings being inclined to the vertical.

7. A candy handling machine having in combination, a series of rings having successively smaller openings arranged to form a continuous tapered channel therethrough, said rings having ribs on their interiors inclined oppositely in adjacent rings, and means for rotating adjacent rings in opposite directions the axis of said rings being inclined to the vertical.

8. A candy handling machine having in combination, a series of rings arranged to form a continuous passage therethrough, said rings having ribbed interior surfaces, said ribs inclining oppositely in adjacent rings, and means for rotating adjacent rings in opposite direction with the circumferential speed of the interior surface increasing from one end of said series to the other the axis of said rings being inclined to the vertical.

9. A candy handling machine having in combination, a series of rings having tapered openings therethrough arranged to form a continuous tapered channel, the interior surface of the rings being threaded, said threads in adjacent rings being oppositely directed, and means for rotating adjacent rings in opposite directions the axis of said rings being inclined to the vertical.

10. A candy handling machine comprising a tapered channel circular in cross section having longitudinal sections thereof provided with ribbed surfaces, said ribs being oppositely inclined in adjacent rings, and means for rotating adjacent rings in opposite directions the axis of said rings being inclined to the vertical.

11. A candy drawing machine having in combination, a series of adjacent annular members forming a runway therethrough, the adjacent ones of said members moving in opposite directions, and means on said members adapted to act on the candy and progress the same in one direction along said runway.

12. The structure set forth in claim 1, and means for delivering material to one end of said channel.

In testimony whereof I affix my signature.

ERNEST L. HAMILTON.